United States Patent [19]
Toth et al.

[11] 3,818,468
[45] June 18, 1974

[54] SELF-CONTAINED LIQUID DETECTOR

[76] Inventors: Dwight B. Toth, 6060 Clear Valley Rd., Hidden Hills, Calif. 91302; William G. Toth, 7148 Cold Water Canyon Ave., North Hollywood, Calif. 91605; Alan B. Lees, 16568 Goldenrod Pl., Encino, Calif. 91316

[22] Filed: Sept. 15, 1972

[21] Appl. No.: 281,867

[52] U.S. Cl. ......... 340/224, 128/138 A, 200/61.05, 325/113, 325/119, 340/235
[51] Int. Cl. ......................................... G08b 21/00
[58] Field of Search .................. 340/235, 224, 416; 128/138 A; 200/61.05; 325/113, 116, 119

[56] References Cited
UNITED STATES PATENTS
3,460,123 8/1969 Bass .................................. 340/235
3,508,235 4/1970 Baisden .............................. 340/235

Primary Examiner—John W. Caldwell
Assistant Examiner—Daniel Myer
Attorney, Agent, or Firm—Nilsson, Robbins & Berliner

[57] ABSTRACT

A liquid detector for determining the presence of urine in an article of clothing such as an infant's diaper or undergarment. The detector includes a housing member containing a transmitter for emitting electrical signals when a predetermined amount of liquid is detected by the system. A pair of probes, which form electrodes, are secured to the housing. The probes are pivotally mounted on the housing, and a plunger is movably secured to the housing. Movement of the plunger in a first direction causes one end of the probes to be spaced apart from the housing and enables the article to be spaced between the housing and the probe ends. The probe ends are tapered to allow the probes to pierce the article surface.

4 Claims, 5 Drawing Figures

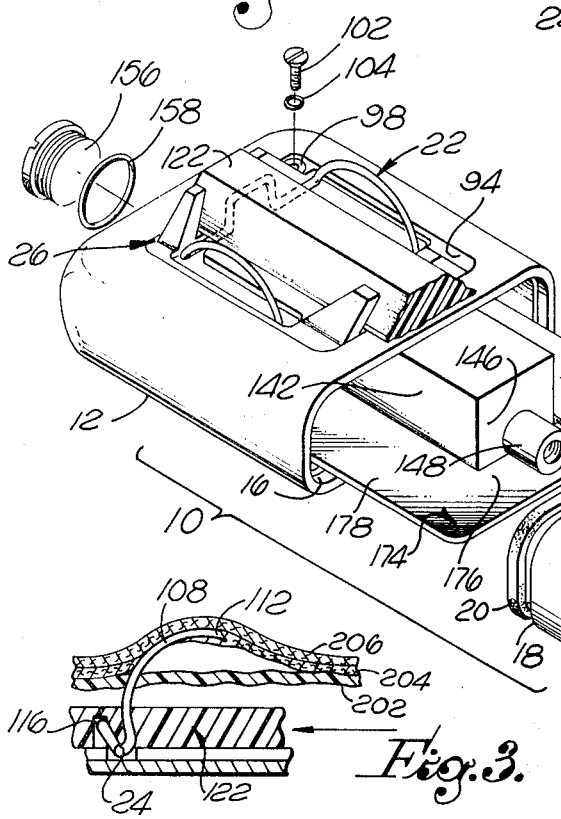
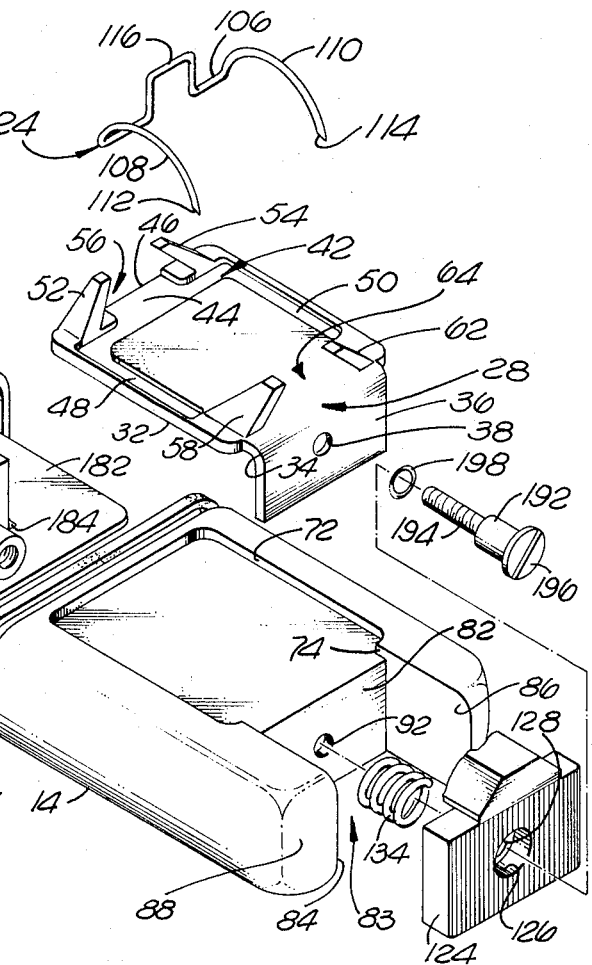
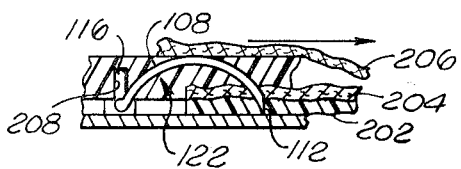
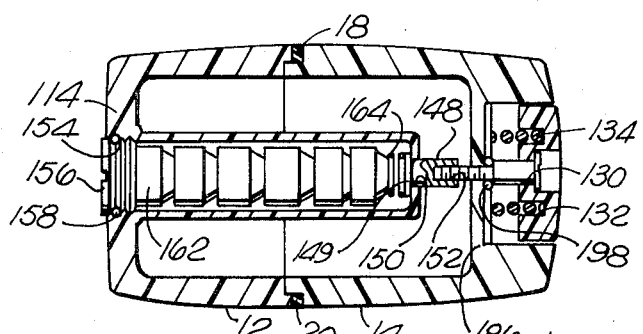
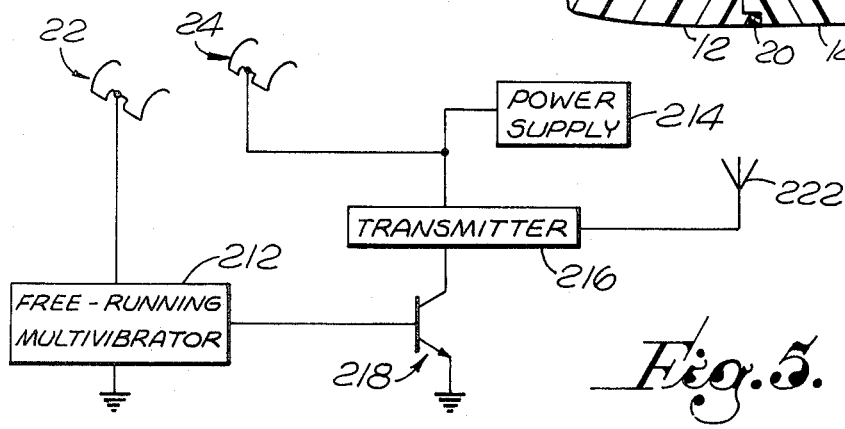

SELF-CONTAINED LIQUID DETECTOR

BACKGROUND OF THE INVENTION

1. Field of the Invention

The field of art to which the invention pertains includes the field of liquid detection, particularly with respect to a system for transmitting an electrical signal when an article of clothing contains liquid thereon.

2. Description of the Prior Art

The best known prior art is found in U.S. Pat. Nos. 3,460,123 and 3,530,855.

Conventional liquid detectors, particularly for determining when an article of clothing contains urine, have been relatively complex. In one arrangement, a transmitter is worn by the person and is connected to the integral part of the undergarment which normally would be urinated upon. A pair of screens are positioned on either side of the crotch portion of the undergarment. When urination occurs, a liquid permeable insulator provides a conduction path between the screens. A transmitting device, operable by the detected urine, provides an output signal so as to notify someone that urination has occured. Such a garment is normally provided with the screens forming an integral part thereof and the entire garment, together with the screens, is washed as a unit. In an alternative arrangement, a pair of electrodes are positioned on opposite sides of the crotch portion of a garment. Leads from the electrodes are connected to a transmitter circuit worn on an arm or other body portion. When the wearer of the garment urinates, the garment portion provides a low resistance path between the electrodes thereby initiating the transmitter circuit.

The prior art liquid detectors are primarily useful where the wearer is an adult or older child. However, such devices are not successful when it is necessary to detect urination by a baby. In the former device, the conductive screens form an integral part of the garment. Thus, it becomes quite costly to provide a plurality of such garments. In addition, when the transmitter is worn on the arm or other body portion of the baby, constant movement will tend to disconnect the wiring interconnecting the electrodes and the transmitter. Thus, the only successful means for detecting urination of a baby has been to physically check the diaper of the baby. As a result, the infant often remains in a soiled diaper for overly long periods of time. When a soiled diaper is worn for too long a period of time, and the baby has sensitive skin, irritation and resultant development of rashes has been found to occur.

In order to overcome the attendent disadvantages of prior art liquid detectors for determining the presence of urine on a child's diaper or other clothing, the present invention provides a relatively simple self-contained mechanism which can be attached to conventional diapers. Electrodes are connected to a housing member of the mechanism which contains a transmitter. The electodes are designed to pierce the plastic lining of a disposable type diaper and electrically contact the outer absorbing layer of material. The housing member together with the electrodes are formed in a miniature self-contained unit which may be easily secured to the diaper of an infant with a minimum of discomfort. No external wiring is required between the mechanism and the diaper thus preventing accidental disconnection of the device by movement of the infant. The mechanism utilizes a minimum of electrical power and is moisture-sealed to prevent leakage of the urine into the housing.

SUMMARY OF THE INVENTION

A self-contained liquid detector includes a housing member containing a transmitter. Electrical signals are emitted by the transmitter when a predetermined amount of liquid is detected. Means for actuating the transmitter when the liquid is detected includes a pair of probes for attachment to an article of clothing. The probes are secured to the housing member.

BRIEF DESCRIPTION OF THE DRAWINGS

FIG. 1 is a perspective view, partially exploded and broken away, of the liquid detector made in accordance with the invention;

FIG. 2 is a top cross-sectional view of the detector of FIG. 1 showing the internal structure thereof;

FIG. 3 is a cross-sectional fragmentary view of the detector of FIG. 1 showing the probes in a first position;

FIG. 4 is a cross-sectional fragmentary view of the detector of FIG. 1 showing the probes in a second position; and FIG. 5 is a schematic representation of the liquid detector shown in FIG. 1 incorporated in a detector system.

DESCRIPTION OF THE PREFERRED EMBODIMENT

Referring now to the drawings, shown in FIG. 1 is a liquid detector 10 made in accordance with the present invention. The detector includes an elongated housing having a pair of housing halves 12 and 14. Each of the housing halves are open at one end 16 and 18, respectively. The halves are joined together at the open ends 16 and 18. A sealing gasket 20, which forms a moisture seal, is positioned at the junction of the open ends.

Mounted on the top of each of the housing halves 12 and 14 are a first probe 22 and a second probe 24, respectively, each of which are identical. The probes 22 and 24 are each coupled to a first terminal member 26 and a second terminal member 28, respectively. The terminal member 28 is formed of a generally square-shaped plate 32. A short reduced width section 34 is connected between one end of section 32 and a tab portion 36 which extends at a right angle downwardly from the section 34 and contains a centrally located opening 38. A depression 42 is formed on a portion of the periphery of the section 32 with the central portion 44 of the depression being at the end of the section 32 opposite the junction with section 34. The central portion extends to the edge 46 of the section. In addition, the depression 42 is formed of a first side portion 48 and a second side portion 50 which extends from an end of the central portion 44, respectively, toward the other end of the section 32.

A first pair of transversely extending posts 52 and 54 are positioned at one end of the section 32 adjacent the ends of the central portion of the depression. The posts extend at an angle toward each other and define a first tapered opening 56 therebetween. At the opposite end of the section 32, adjacent the junction with the reduced width section 34, a second pair of transversely extending posts 58 and 62 similar to the first pair of posts 52 and 54, define a second tapered opening 64 similar to the first opening 56.

A recess 72, whose dimensions are slightly greater than that of the plate section 32, is formed on the top surface of the housing 14 and is integral with a reduced width recess 74 at one end thereof. The plate section 32 and reduced width section 34 fit flush in the recesses 72 and 74, respectively. The top surface of the sections 32 and 34 are thus flush with the top surface of the housing 14. In addition, the tab portion 38 fits against an end wall 82 formed at the opposite end of the housing 14 from the open end 18. The end wall 82 forms a part of an indentation 83 which contains a pair of side walls 84 and 86 which extend from the end wall 82 to the end surface 88 of the housing. In addition, the end wall 82 contains an opening 92 therein which is aligned with the opening 38 in the tab portion 36.

The terminal member 26 is similar to the plate section 32 of the member 28, but does not contain a reduced width section or a tab portion. The terminal member 26 is positioned in a generally square recess 94 formed in the top surface of the housing 12. In addition, one corner of the terminal member 26 contains an opening 98. An opening in the top surface of the housing 12 (not shown) is aligned with the opening 98. The terminal member 26 is secured to housing half 12 by means of a contacting screw 102 which is positioned in the opening 98 and the opening in the top surface of the housing with an O-ring 104 providing a moisture seal.

Each of the probes 22 and 24 are generally U-shaped and comprise a central portion 106 which interconnects a pair of arcuately shaped terminal prongs 108 and 110. The prongs 108 and 110 which form the legs of the U, each have tapered ends 112 and 114 respectively at one end thereof. The curvature of the prongs 108 and 110 are such that the prongs are spaced from the first and second side portions 48 and 50, respectively, of the depression 42 except at the ends 112 and 114 which normally rest adjacent the posts 58 and 62, respectively. The other end of the prongs are each integrally formed with one end of the central portion 106. The central portion 106 has an indented section 116 which is normally positioned in a plane perpendicular to the terminal plates 26 and 28.

A spring-biased plunger 122 of generally trapezoidal cross-section is inserted through each of the openings 56 and 64 of the terminal member 28 as well as the similar shaped openings formed in the terminal member 26. The plunger 122 is of such cross-sectional dimension that it is slidable in the openings 56 and 64 yet cannot be removed therefrom, unless it is axially moved out of the openings. The plunger 122 further comprises an actuating end plate 124 formed in a plane perpendicular to the longitudinal axis of the plunger 122 and is positioned in the indentation formed by the end wall 82 and the side walls 84 and 86. An enlarged diameter bore portion 126 extends from the outer surface of the end plate 124 and terminates at an outwardly facing shoulder 128. A reduced diameter bore portion 130 extends from the shoulder 126 to the inner surface of the plate 124.

An annular groove 132 is formed in the inner surface of the end plate 124 which is coaxial with the bore portion 130 and has a diameter greater than the bore portion 126. A spring member 134 is positioned adjacent the end wall 82 and is inserted into the annular groove 132 thus, spring-biasing the plunger 122 outwardly from the indentation 83.

A battery compartment 142 is formed integrally with the end wall 144 of the housing half 12. The battery compartment is of generally rectangular configuration and extends from the end wall 144 beyond the open end 16 of the housing half 12. When the housing halves are assembled, the battery compartment extends into the housing half 14. The end wall 146 of the battery compartment in the housing half 14 contains a terminal member 148. A flange 149 of the member 148 is adjacent the interior surface of the end wall 146. The member 148 has an internally threaded portion 152 which extends through an opening 150 in the end wall 146. In addition, the end wall 144 of the housing half 12 has a threaded opening 154 into which a grounding screw 156 is inserted and is moisture sealed by means of an O-ring 158.

A plurality of batteries 162 are inserted into the battery compartment 142. The batteries are coupled in series between the grounding screw 156 and a conductive spring 164 adjacent the flange 149 of the terminal member 148.

A U-shaped printed circuit board 174, having a central leg 176 and a pair of side legs 178 and 182, is positioned in the housing halves 12 and 14. The printed circuit board is formed in a plane parallel to the housing halves. The U-shape defines a slot 184 whose configuration is that of the cross-sectional area of the rectangular battery compartment 142. The printed circuit board is positioned so that it is slightly below the plane of the terminal member 148 and extends from the end wall 144 of the housing through to the opposite end wall 186 of the housing 14. As can be seen in FIG. 2, the printed circuit board substantially fills a plane of the hollow housing area, not occupied by the battery compartment 142.

Electric connection to the terminal member 28 is made by means of a screw 192 having a threaded front end 194 and a flange head 196. The screw is inserted through the bores in the end plate 124, the opening 38 in the tab portion 36, the opening 92 in end wall 82, and is secured to the threaded portion 152 in the member 148. In addition, a moisture sealing O-ring 198 is seated adjacent the opening 38. The flange head 196 of the screw 192 is positioned in the bore 126 adjacent the shoulder 128, and limits outward movement of the plunger 122. In addition, the screw 192 is utilized to secure the two housing halves 12 and 14 together, as it is inserted into the threaded portion 152 of the member 148 as can be seen clearly in FIG. 2. Electrical connection from the terminal member 26 can be made from the contacting screw 102 to the printed circuit board.

Referring now to FIGS. 3 and 4, there is shown an illustrative embodiment for attaching one of the probes 22 or 24 to an article of clothing which is normally subjected to wetting such as by urination thereon. In FIGS. 3 and 4, the article of clothing is illustrated as being a disposable diaper having an outer plastic liner 202 and a plurality of layers of inner lining 204 and 206. The plunger 122 contains a pair of transversely extending slots 208 into which the indented section 116 of each of the probes is inserted. In the normally unbiased position of FIG. 4, the section 116 is positioned in the slot 208 in a plane parallel thereto. When the plunger is biased inwardly in the direction of the arrow of FIG. 3, the tapered ends 112 and 114 raise up as shown in the drawing. With the plunger in the position shown in FIG. 3, the tapered ends may be used to pierce the outer diaper lining 202 and one of the inner layers 204 of the diaper. When pressure is removed from the end plate 124 of the plunger, the probe returns to the position shown in FIG. 4. It should be understood, of course, that the detector could be used with other types of garments as well, the disposable diaper being shown for illustration purposes only.

Referring now to FIG. 5, there is shown a schematic illustration of the liquid detector used in a conventional transmitter circuit. The circuit contains a free-running multivibrator 212 to which the probe 22 may be attached. In addition, the probe 24 as well as a terminal of the power supply 214 are connected to a transmitter 216. A transistor 218 has its base terminal connected to the output of the free-running multivibrator 132 and its collector-emitter circuit connected between the transmitter and ground. In addition, an antenna 222 may be connected to the output of the transmitter.

Typically the entire circuit including the free-running multivibrator 212, the transmitter 216, transistor 218 and the antenna 222 can be formed on a printed circuit board 174. When the layers 204 and 206 of the diaper contain sufficient liquid thereon, a reduced resistance path is formed between each of the ends of the probes. When the ohmic resistance between the probes 22 and 24 drops below a predetermined value, sufficient voltage from the power supply 214 causes the free-running multivibrator to produced an asymmetrical square wave output. Each output pulse from the free-running multivibrator is coupled to the transistor base of the transistor 218, turning on the transistor for sufficient duration to cause the transmitter 216 to produce an output signal over the antenna 222. The transmitter 216, which may be a slug-tuned type transmitter, is activated and the signals from the transmitter may be picked up by the receiver which may be in the possession of a mother or other person who desires to know when the diaper contains sufficient liquid thereon.

By utilizing a free-running multivibrator having a highly asymmetrical output, the transmitter 216 may be turned on for a short interval of time and turned off for a long interval. This low-duty cycle can be utilized to provide a substantial reduction in current drain from the power supply in order to prolong the lifetime of the batteries used to operate the detector. It should be noted that the probes 22 and 24 contain a pair of ends 112 and 114. Such a redundant design enables liquid to be detected when only one of the ends 112 or 114 of each of the probes 22 or 24 is connected across a wet portion of the diaper or other article.

Further, it should be noted that gaskets or O-rings are provided into each opening of the housing. This configuration prevents external moisture from intruding into the housing.

I claim:

1. A self-contained liquid detector comprising a housing member containing a transmitter for emitting electrical signals when a predetermined amount of conductive liquid is detected;

means for actuating said transmitter when said liquid is detected on a garment made of liquid absorbing fabrics including a pair of probes for attachment to said garment, said probes being pivotably mounted on the external surface of said housing member, said housing member including a source of electric power and electrical circuitry therein;

moisture sealing means formed on a periphery of a portion of said housing member for preventing liquid from entering said housing member; and a plunger movably secured to said housing member, movement of said plunger in a first direction causing one end of said probes to pivot and be spaced apart from said housing member for enabling said garment to be spaced between said housing member and said probe ends.

2. A liquid detector in accordance with claim 1 wherein said probe ends are tapered for enabling said probe to penetrate said garment surface.

3. A liquid detector in accordance with claim 1 wherein said probes are joined together by a central portion to define a generally U-shaped device, each of said probes being pivotal about said central portion, a part of said central portion extending in a plane generally transverse to a plane of said housing to which said U-shaped device is secured.

4. A liquid detector in accordance with claim 3 wherein said plunger is spring biased for enabling said probe ends to be normally adjacent to a surface of said housing member and wherein said probes are arcuately shaped for enabling said probes to be spaced from said housing.

* * * * *